(12) United States Patent
Chung et al.

(10) Patent No.: US 7,596,353 B2
(45) Date of Patent: Sep. 29, 2009

(54) ENHANCED BLUETOOTH COMMUNICATION SYSTEM

(75) Inventors: Woo-Suk Chung, Gyeonggi-do (KR); Sung-Bong Kang, Seoul (KR); Jeon-Taek Im, Gyeonggi-do (KR); Joong-Kyu Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 602 days.

(21) Appl. No.: 11/085,918

(22) Filed: Mar. 21, 2005

(65) Prior Publication Data

US 2006/0025075 A1 Feb. 2, 2006

(30) Foreign Application Priority Data

Aug. 2, 2004 (KR) .................... 10-2004-0060814

(51) Int. Cl.
*H04B 7/00* (2006.01)
(52) U.S. Cl. ............... 455/41.2; 455/465; 455/557; 370/368; 370/389; 370/392; 370/400; 709/217; 709/218; 709/219; 709/221
(58) Field of Classification Search ............ 455/41.1, 455/41.2, 465, 557; 370/368, 389, 392, 400; 709/217–219, 221
See application file for complete search history.

(56) References Cited

U.S. PATENT DOCUMENTS

| H01944 H * | 2/2001 | Cheswick et al. ............ 726/11 |
| 6,804,237 B1 * | 10/2004 | Luo et al. .................... 370/392 |
| 7,269,183 B2 * | 9/2007 | Morris ........................ 370/466 |
| 7,272,500 B1 * | 9/2007 | Walker ....................... 701/213 |
| 2003/0013411 A1 * | 1/2003 | Uchiyama ................... 455/40 |
| 2003/0134596 A1 * | 7/2003 | Zhu ............................ 455/41 |
| 2005/0083741 A1 * | 4/2005 | Chang et al. ................ 365/200 |

FOREIGN PATENT DOCUMENTS

KR 2003-0073621 9/2003

OTHER PUBLICATIONS

Kjell Jorgen Hole "Bluetooth part 5: The Host Controller Interface", Jun. 8, 2004, 12 pages.

Palo Wireless "Bluetooth Resource Center" at http://www.palowireless.com/infotooth/glossary.asp, pp. 1-17, Jan. 28, 2001.

(Continued)

*Primary Examiner*—Tuan A Pham
(74) *Attorney, Agent, or Firm*—Marger Johnson & McCollom, P.C.

(57) ABSTRACT

The present invention provides a system with a plurality of Bluetooth dongles connected to a single host. Each dongle is connected to a different port on the host and each dongle can accommodate a piconet of up to seven Bluetooth devices. The host communicates with the Bluetooth devices via Bluetooth channels. The host includes an application layer, a Host Control Interface (HCI) layer and an interface device driver layer. An Interface Map Table (IMT) is stored in the host. The IMT associates each port on the host with the BD address of a particular Bluetooth dongle and with the channels associated with the particular dongle. The HCI layer and the Interface handler layer consult the IMT to direct commands and data to the correct port on the host.

14 Claims, 5 Drawing Sheets

OTHER PUBLICATIONS

Widcomm Inc. "Bluetooth Protocol Stack for window" pp. 1-2, Dec. 2000.

Questra Corporation "Communications Protocols fro e-Applications Bluetooth", 2001 19 pages.

Palo Wireless "Bluetooth Resource Center" 4 pages., Apr. 17, 2001.

Palo Wireless "Bluetooth Resource Center" at http://www.palowireless.com/infotooth/tutorial.asp 3 pages., Jan. 28, 2001.

* cited by examiner

FIG. 3

INTERFACE MAP TABLE

| PORT IDENTIFICATION | BD_ADDRESS | CONNECTION |
|---|---|---|
| PORT 1 | ADDRESS 1 | CHANNEL ID 1 |
| | | CHANNEL ID 2 |
| | | CHANNEL ID 3 |
| PORT 2 | ADDRESS 2 | CHANNEL ID 4 |
| | | CHANNEL ID 5 |
| | | CHANNEL ID 6 |

FIG. 4A

HCI COMMAND PACKET

| OP CODE | | PARAM.LEN | PARAM.0 |
|---|---|---|---|
| OCF | OGF | | |
| PARAMETER 1 | | PARAMETER 2 | |
| | | | |
| | | PARAMETER n | |

FIG. 4B

HCI EVENT PACKET

| EVENT CODE | PARAM.LEN | EVENT PARAMETER 0 |
|---|---|---|
| EVENT PARAMETER 1 | | EVENT PARAMETER 2 |
| | | |
| | | EVENT PARAMETER n |

PROCEDURE FOR PROCESSING COMMAND AND EVENT PACKETS

ENHANCED BLUETOOTH COMMUNICATION SYSTEM

This application claims priority from Korean Patent Application No. 2004-60814, filed on Aug. 2, 2004, the contents of which is herein incorporated by reference in its entirety.

FIELD OF THE INVENTION

The present invention relates to wireless communication and more particularly to wireless communication systems that utilize the Bluetooth protocol.

BACKGROUND OF THE INVENTION

There are a wide variety of wireless communication technologies in use and there are a number of widely used standards. One relatively new standard is known as the "Bluetooth" communication protocol.

The Bluetooth standard defines a technology that allows electronic devices to make wireless connections to another electronic devices. The connections are made without any direct user action. Bluetooth is a relatively short range wireless technology. It is designed to replace cables in devices such as PDAs, cell phones, cameras, speakers, headsets, etc.

The Bluetooth technology utilizes one universal radio link to replace the cables that are normally used to interconnect electronic devices. The key features of the Bluetooth technology are robustness, low complexity, low power and low cost.

Bluetooth was designed for devices that operate in noisy frequency environments. In order to make robust communication links, the Bluetooth uses a fast acknowledgement and frequency hopping. In the United States Bluetooth radios operate at 2.4 GHz in an unlicensed frequency band. Bluetooth minimizes interference by hopping to a new frequency after transmitting or receiving a packet. In general a Bluetooth radio system hops faster and uses shorter packets than do other communication technologies.

The Bluetooth standard includes two levels: First, Bluetooth provides agreement at the physical level. That is, the Bluetooth standard includes a radio-frequency standard. Bluetooth also provides agreement at the next higher level. That is, at the level where products must agree on matters such as, when bits are sent, how many bits will be sent at a time and how the parties to a conversation can be certain that the message received is identical to the message that was sent.

The specifications that define the Bluetooth technology are publicly available on the internet from the web site maintained by the Bluetooth organization. The Bluetooth standard is hereby incorporated herein by reference.

Some Bluetooth systems include an integrated Bluetooth interface in the host. In other Bluetooth devices, the host is connected to a "dongle" by a conventional interface such as by a USB port or by an RS232 port. The dongle then provides a Bluetooth interface to various Bluetooth devices.

An example of a prior art Bluetooth system is shown in FIG. 1. The system illustrated in FIG. 1 has three parts, namely, a host 100, a dongle 101 and Bluetooth external devices (devices A to F as shown in FIG. 1). The dongle 101 and the Bluetooth devices A to F form what is called a piconet. The devices in a piconet share a common communication data channel which is divided into time slots. Each slot is 625 microseconds long. The piconet has a master (which is the dongle) and up to seven slaves. The master transmits in even time slots, the slaves transmit in odd time slots.

The Bluetooth protocol defines various layers. In a Bluetooth system that includes a dongle, the layers in the host interact with layers in the dongle. For example, a conventional Bluetooth system that includes a dongle may have the layers illustrated in FIG. 1. Since the present invention utilizes standard Bluetooth devices, the make up of in the Bluetooth devices is not shown or discussed herein.

As an example, a host and a dongle may have the protocol layers as illustrated in FIG. 1. In the host, the top layer 102 is the application program layer. Program layer 102 is the program layer that ultimately utilizes the data received from the Bluetooth devices A to F and program layer 102 is the layer which generates data that is destined for the Bluetooth devices.

The next layer in the host is the profile layer 104. The Bluetooth specifications defines a wide array of profiles. Profiles describe how various user models can be implemented. A profile describe the minimum implementations of the Bluetooth protocol stack for an application. Manufacturers can add to the profiles defined by the specifications, but each profile defined in the specifications describes a minimum recipe for building a particular type of device. The profile concept is used by Bluetooth to facilitate interoperability between different products from different manufacturers.

The protocol stack 106 is below the profile layer 104. The protocol stack layer 106 defines the set of stacked protocols from lower layers to upper layers. This stack enables devices to locate each other, establish a connection, exchange data and interact with one another through various applications. The protocol stack 106 can for example include the Logical Link Control and Adaptation Protocol (L2CAP), the Service Discovery Protocol (SDP) or the Radio Frequency Communication protocol (RFCOMM). For example, if the L2CAP is used, it controls such things as the transfer of data, disconnecting and timeouts and it takes data from higher protocol layers and applications and it sends the data to lower layers A Host Control Interface (HCI) layer exists in both the Host and in the dongle. As shown in FIG. 1, the host includes HCI layer 108 and in the dongle includes HCI layer 114. The HCI layer 108 provides the standard protocol for transmitting and receiving packets through the physical link to the dongle. The HCI layer provides a command interface and it provides a uniform method of accessing the Bluetooth baseband capabilities. During the initialization sequence, the HCI layer creates read and write threads, it establishes a connects to the Bluetooth transport, and it resets and reads the device buffers. Once the initialization operations have been completed, the HCI layer enters an initialized state and it is ready to accept clients. HCI command packets, HCI event packets and HCI data packets are transmitted through the interface 150 from the host to the dongle.

The Interface Device Driver Layer 110 and the Interface Device Firmware layer 122 are the layers that provide the actual physical connection between the host and the dongle. This can for example be done using the standard RS232 protocol.

The link manager layer 116 controls link settings such as encryption, power management. Link manger layer 116 also controls the setting of connection conditions such as park, sniff and hold. Finally the Base Band 118 is the physical radio layer in the system. The Base Band Layer 118 manages the physical channels. The baseband protocol works with the link manager 116 for carrying out link level routines like link connection and power control. The baseband also manages asynchronous and synchronous links, and manages the communication scheme.

In the prior art systems, layers such as those shown in FIG. 1, connect one host to one dongle and the dongle in turn communicate with a plurality of Bluetooth devices in a piconet.

SUMMARY OF THE PRESENT INVENTION

The present invention provides a system with a plurality of Bluetooth dongles connected to a single host. Each dongle is connected to a different port on the host and each dongle can accommodate a piconet of up to seven Bluetooth devices. The host communicates with the Bluetooth devices via Bluetooth channels. The host includes an application layer, a Host Control Interface (HCI) layer and an interface device driver layer. An Interface Map Table (IMT) is stored in the host. The IMT associates each port on the host with the BD address of a particular Bluetooth dongle and with the channels associated with the particular dongle. The HCI layer and the Interface handler layer consult the IMT to direct commands and data to the correct port on the host.

With this invention the number of Bluetooth devices that can be connected to a host is increased and/or the speed of transmission to the Bluetooth devices can be increased.

BRIEF DESCRIPTION OF THE DRAWINGS

FIG. 3 is a diagram of an Interface Map Table (IMT).

FIGS. 4A, 4B and 4C are diagrams of different types of packets.

DETAILED DESCRIPTION

Figure 2:
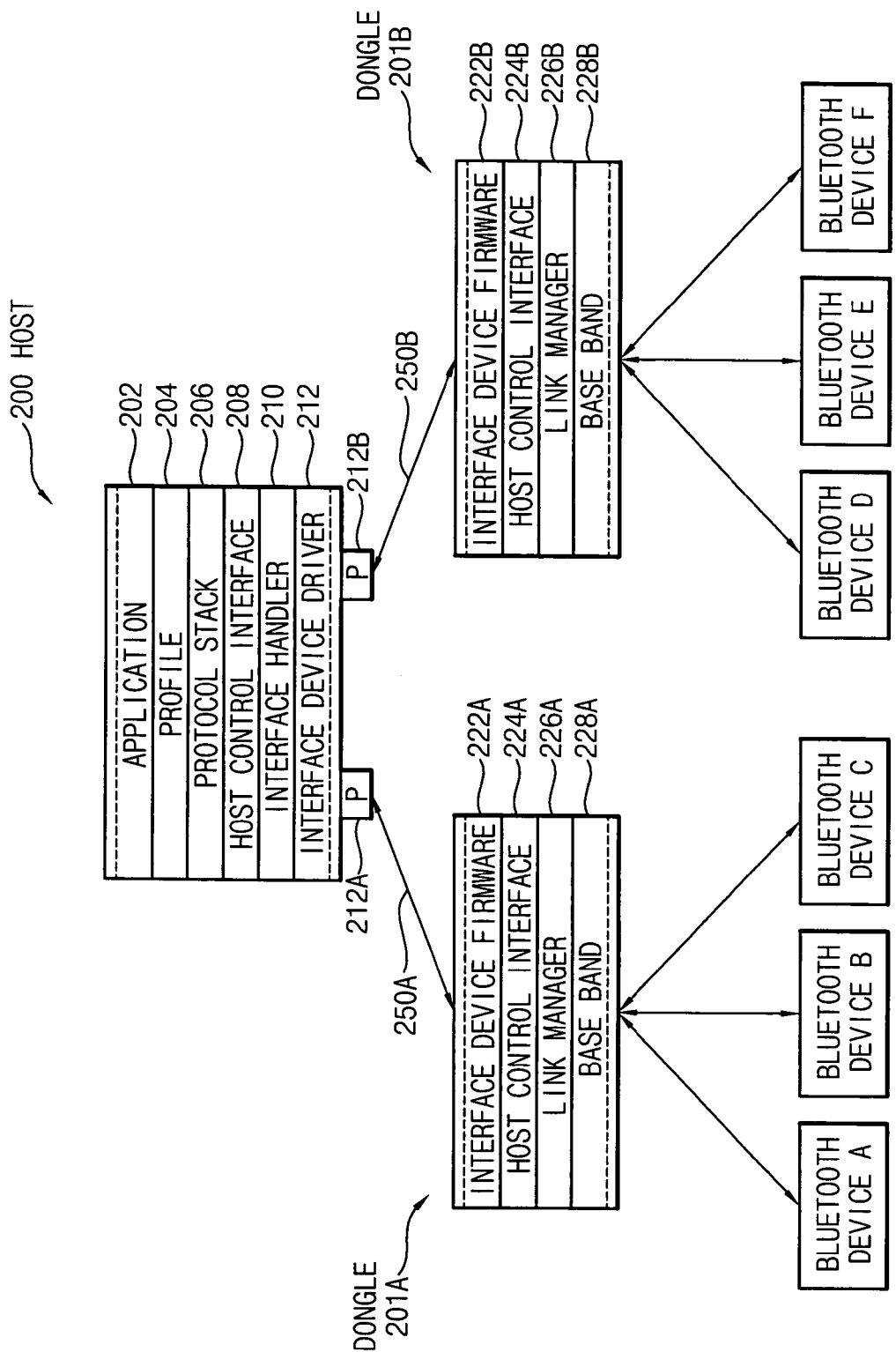
FIG. 2 is a block diagram showing a first embodiment of the present invention.

A first preferred embodiment is shown in FIG. 2. The embodiment shown includes a host 200 and two Bluetooth dongles 201A and 201B. FIG. 2 shows the relevant protocol layers in the host 200 and in the dongles 201A and 210B.

Figure 1:
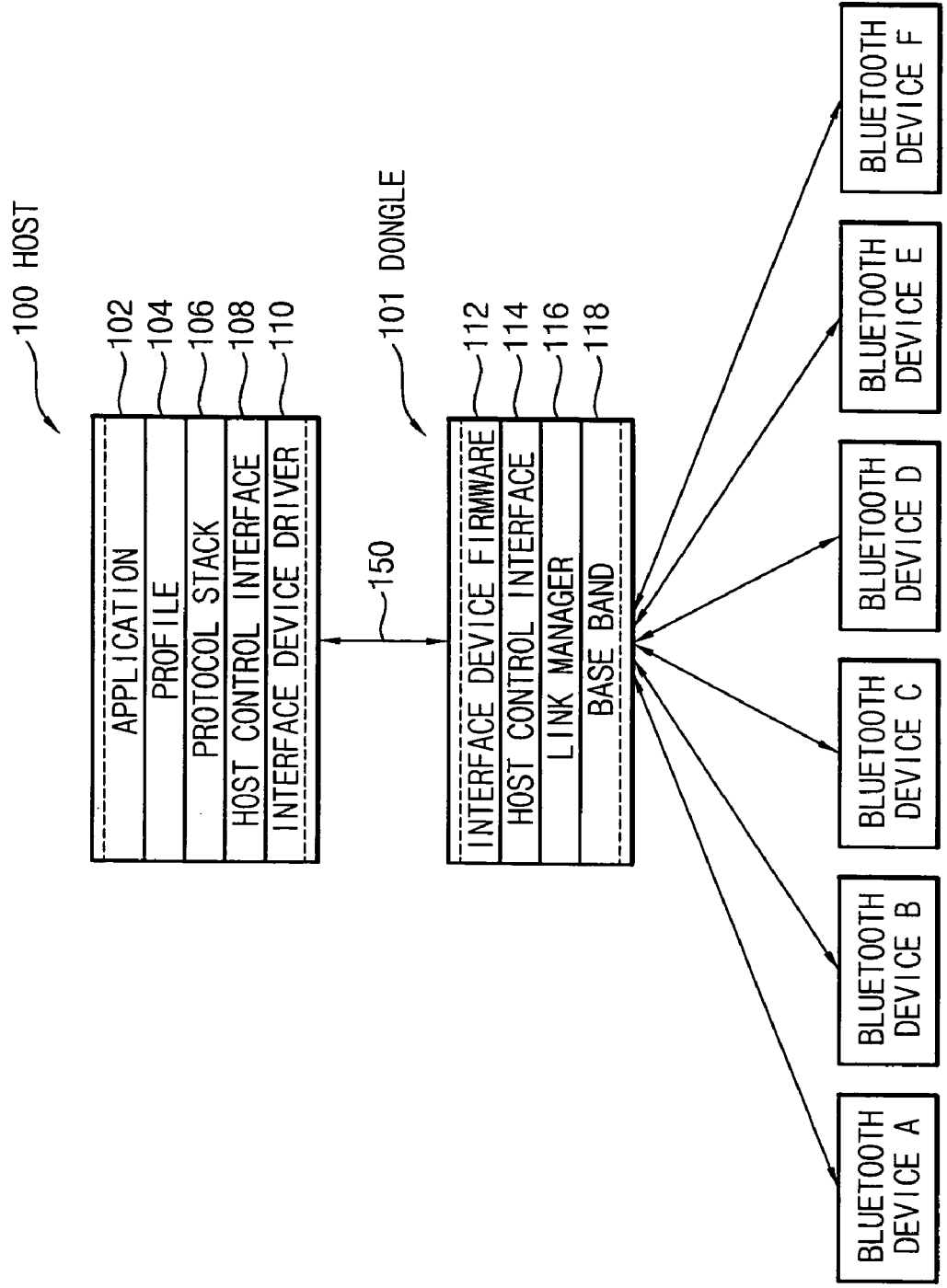
FIG. 1 is a diagram illustrating the layers in a prior art Bluetooth system.

It is noted that the system shown in FIG. 2 has an Interface Handler layer 210. The prior art system shown in FIG. 1 does not include an Interface Handler Layer. While Interface Handler layer 210 is a separate and distinct layer in the embodiment shown in FIG. 1, as will be described later, in alternate embodiments, what is shown as layer 210 in FIG. 2, can be included as a part of HCI layer 208.

A conventional Bluetooth system can only accommodate one dongle and a maximum of seven Bluetooth devices can be connected to the one dongle. With the embodiment of the invention shown herein, the system can accommodate two dongles. Using two dongles a maximum of fourteen Bluetooth devices can be accommodated.

The bandwidth capacity of a Bluetooth dongle is about 721 Kbps. Thus, for example, when six Bluetooth devices are connected to a single dongle, each device has a bandwidth of about 120 Kbps available (721 divided by six). If six Bluetooth devices are connected to the embodiment shown herein which includes two dongles, each Bluetooth device would have a bandwidth of about 240 Kbps available (721 divided by 3) since as shown in FIG. 2, each dongle only communicates with three Bluetooth devices.

It should be understood that while the embodiment shown herein includes two dongles connected to a host, using the present invention a host could accommodate any number of dongles provided that it has the necessary computation capacity available.

In the example illustrated in FIG. 2, three Bluetooth devices are connected to each dongle. Bluetooth devices A, B and C are connected to dongle 201A and Bluetooth devices D, E and F are connected to Bluetooth dongle 201B. The Bluetooth devices A to F are conventional Bluetooth devices and, thus, they will not be described further herein.

The host 200 has two ports 212A and 212B. Ports 212A and 212B can be USB ports or RS232 ports. It is conventional for a host to have multiple USB or multiple RS232 ports. However, prior art Bluetooth systems such as that illustrated in FIG. 1, two Bluetooth dongles could not be connected to two ports on a single host. The present invention makes it possible to connect multiple dongles to multiple ports on a host.

The host has an application layer 202, a profile layer 204, a protocol stack layer 206 a host control Interface layer 208 and an interface device driver layer 212 similar to the corresponding layers in conventional Bluetooth systems. However, of particular note is the fact that host 200 includes a interface handler layer 210. The operation of the interface handler layer 210 is explained below.

The dongles 201A and 201B are similar to conventional dongles in prior art systems. Dongle 201A is identical to dongle 201B except that it has a different address. That is, as is conventional, each dongle has a unique address known as a BD_ADDR. The dongles include an interface device firmware layer 222, a host control interface layer 224, a Link Manager layer 226 and a baseband layer 228. Each dongle communicates with the associated Bluetooth devices using radio signals.

The interface handler layer 210 generates a interface map table such as the table shown in FIG. 3. The interface map table associates each channel with a particular dongle (that has a particular BD_address). The interface map table also associates each channel with and a particular port on the host.

The host communicates with Bluetooth devices A to F using a Time Division Duplex (TDD) scheme as us conventional. The Bluetooth standard technology supports two link types:

Synchronous Connection Oriented (SCO),

Asynchronous Connectionless (ACL)

An ACL link is an asynchronous packet-switched connection between two devices created on the LMP level. ACL packets are used on an ACL link.

An SCO link is a synchronous circuit-switched connection. SCO packets are used on an SCO link. SCO links can be established only after an ACL link is first established. Different master-slave pairs in a piconet can use different link types.

Figure 4C:
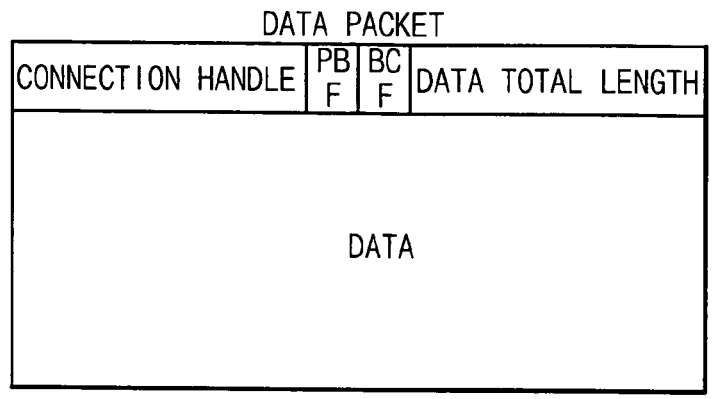

The Bluetooth specification defines sixteen different packet types that can be used on each link type. However, with respect to a description of the present invention we merely need discuss HCI command packets, HCI event packets, and data packets. Examples of these packets are shown in FIGS. 4A, 4B and 4C.

With the present embodiment of the invention, each HCI command packet, such as the packet shown in FIG. 4A, includes a channel identifier (that is, a connection handle) in the first parameter field of the packet identified as Param 0 in the figure. As will be described below, the interface handler layer 210 uses this parameter and the data in the interface map table to direct the HCI command packet to the appropriate dongle.

In a similar manner, each event packet, such as the event packet shown in FIG. 4B, includes a channel identifier (that is, a connection handle) in the field identified in the figure as Event Parameter 0.

Data packets are used for data transmission and reception after the ACL and SCO links have been set. With the present invention, data packets, such as the data packet shown in FIG. 4C have a first field that stores a channel identifier (that is, a connection handle). Other packet types defined by the Bluetooth specification are handled similarly to the packet types described above.

When a packet is being sent from the host to a Bluetooth device, the interface handler layer 210, interrogates the parameter field that contains the connection handle. The interface handler layer 210 then uses this information together with the information in the interface map table to direct the packet to the appropriate dongle and to the appropriate channel.

Figure 5:
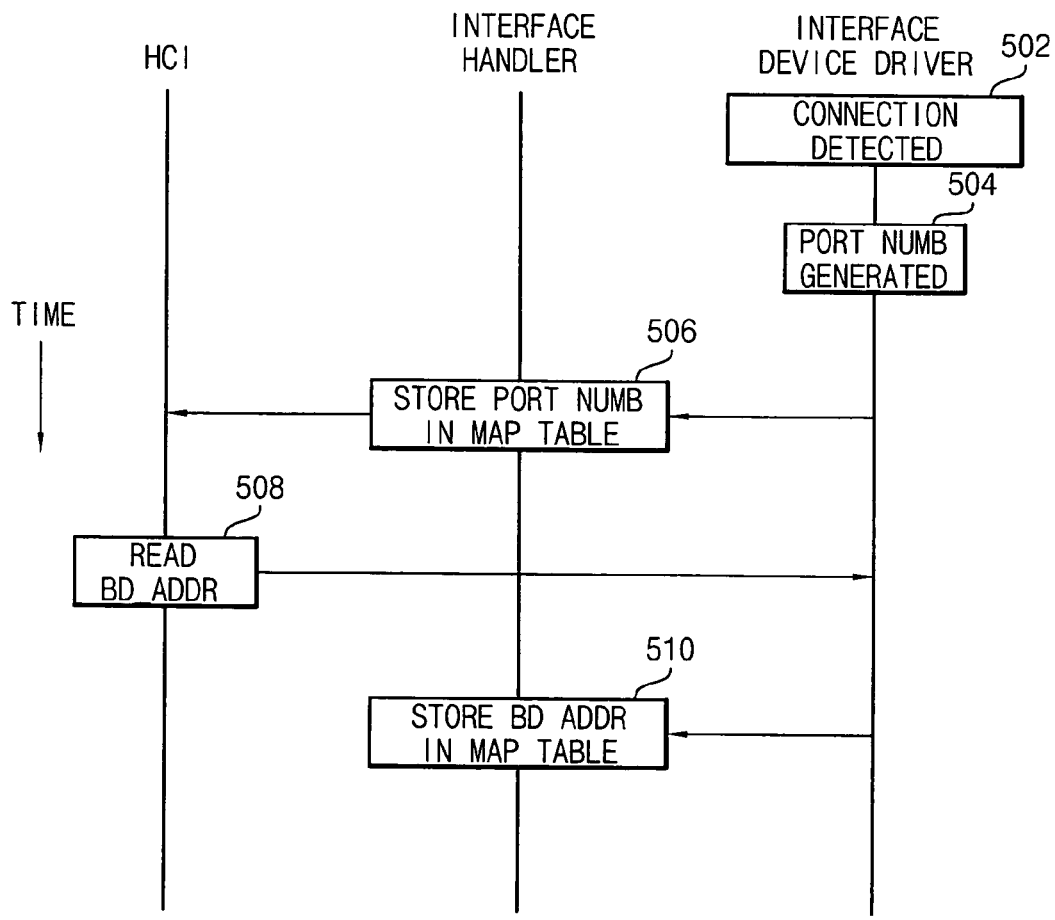
FIGS. 5, 6 and 7 a program flow timing diagrams.
Figure 6:
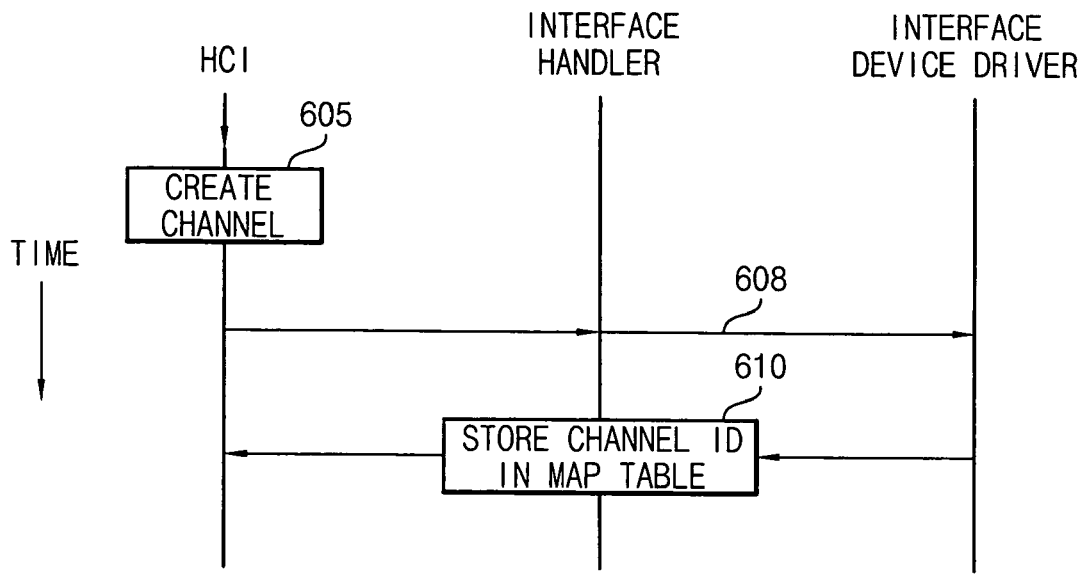
Figure 7:
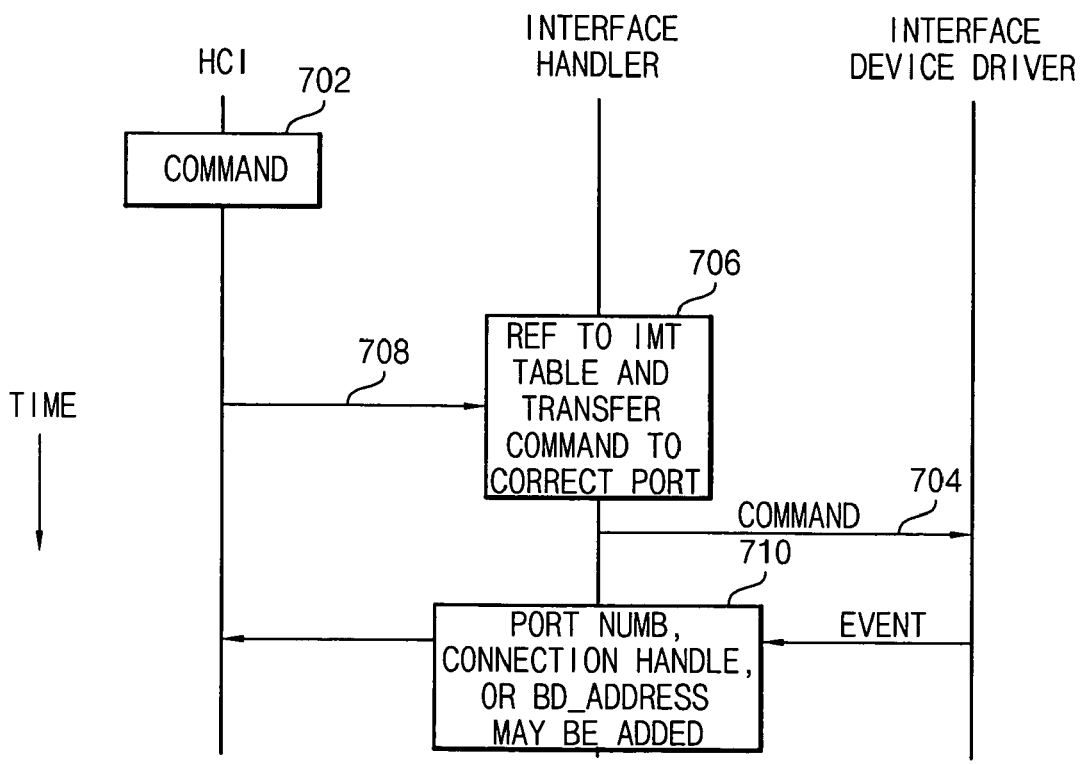

The operation of the system will now be explained with reference to the flow diagrams in FIGS. 5, 6 and 7. FIG. 5 shows what occurs when a dongle is connected to a port on the host system. FIG. 6 shows what occurs when a the HCI layer receives a request to generate a connection. The request is generated in a conventional manner. FIG. 7 shows what occurs when commands are issued from the HCI layer.

The operations shown in FIG. 5, when the interface device driver 212 detects that a dongle has been connected to a port on the host as indicated by block 502. The interface device driver generates an indication of the port number as indicated by block 504 and this number is stored in the interface map table as indicated by block 506. The request goes on to the HCI layer and a command is issued to read the BD_address of the dongle as indicated by block 508. After the BD_address is read from the dongle, the address is stored in the map table and associated with the port number stored as indicated by block 510. With a map table configured as shown in FIG. 3, these two pieces of data are stored on the same line of the interface map table.

The next operations that usually occur are those shown in FIG. 6. After the port number and the BD_address are stored in the Interface Map Table (IMT), the HCI layer issues a channel create command as indicated by block 605. This connection command is passed to the interface device driver layer 212. The interface handler layer then stores the channel ID in the interface map table as indicated by block 610.

FIG. 7 shows what occurs when a command is issued from the HCI layer. The command is sent to the Interface Handler layer which references the IMT table to determine the appropriate port (that is, the appropriate dongle) to which the command should directed. The command is then directed to that port. The event packet which results passes through the interface handler layer to the HCI layer. Also, one of the port Number, connection handle, or BD_aqddress may be added in the event packet that is sent to the HCI layer.

It is noted that in the above described embodiment, the Interface handler layer 210 is a separate layer. In alternate embodiments, the functions of the Interface Handler Layer 210 are incorporated into the HCI layer 208.

While the invention has been shown and described with reference to particular embodiments thereof, it should be understood that various changes in detail may be made without departing form the spirit and scope of the invention. The scope of the invention is limited only by the appended claims.

We claim:

1. A Bluetooth system comprising
   a host computer having a plurality of ports and at least one Bluetooth application,
   a plurality of Bluetooth dongles (BDs), each Bluetooth dongle connected to a particular port on said host computer and having a particular BD address,
   a plurality of Bluetooth devices connected to each of said Bluetooth dongles, each Bluetooth device having a particular channel associated therewith,
   an interface map table stored in said host computer, said interface map table associating each Bluetooth device with a particular port on said host computer, a particular BD address and a particular channel, and
   a host control interface (HCI) layer between said Bluetooth dongles and said host computer, said HCI layer utilizing said interface map table to direct command packets, event packets and data packets between said Bluetooth application and particular Bluetooth devices.

2. The system recited in claim 1 wherein said system includes two ports and a Bluetooth dongle is connected to each of said ports.

3. The system recited in claim 1 wherein said ports are USB ports.

4. The system recited in claim 1 wherein said ports are RS232 ports.

5. A Bluetooth system including
   a host computer that has a plurality of ports,
   programs in said host computer comprising an applications layer, a profile layer, a protocol stack layer, a host control interface (HCI) layer, and an interface device driver layer,
   a plurality of Bluetooth dongles (BDs), each Bluetooth dongle having a particular BD address, each Bluetooth dongle connected to a particular port on said host computer,
   a plurality of Bluetooth devices connected to said Bluetooth dongles, each of said Bluetooth device having a particular channel associated therewith, said Bluetooth devices being controlled by HCI command packets directed by the HCI layer, and
   an interface map table stored in said host computer which associates each device channel with a particular port and a particular BD address,
   whereby said HCI layer utilizes said interface map table to direct HCI commands packets to specific Bluetooth devices.

6. The system recited in claim 5 wherein said system includes two ports and a Bluetooth dongle is connected to each of said ports.

7. The system recited in claim 5 wherein said ports are USB ports.

8. The system recited in claim 5 wherein said ports are RS232 ports.

9. A Bluetooth system comprising:
   a host computer having ports, protocol layers and an interface map table;
   a plurality of Bluetooth dongles (BDs), each Bluetooth dongle connected to a particular port on the host computer and having a particular BD address; and
   at least one Bluetooth device connected to one of the plurality of Bluetooth dongles, the at least one Bluetooth device having a particular channel ID
   wherein the interface map table in the host computer associates the at least one Bluetooth device with the particular port, the particular BD address and the particular channel ID so that the at least one Bluetooth device communicates the host computer through one of the plurality of Bluetooth dongles, and wherein a host control interface layer of the protocol layers utilizes the interface map table to direct command packets, event packets and data packets between the host computer and the at least one Bluetooth device.

10. The Bluetooth system of claim 9, wherein an interface handler layer of the protocol layers generates the interface map table.

11. The Bluetooth system of claim 9, wherein a host control interface layer of the protocol layers utilizes the interface map table to direct command packets, event packets and data packets between the host computer and the at least one Bluetooth device.

12. The system recited in claim 1 wherein each of said command packets comprises a channel identifier used by the HCI layer to direct said command packets between said Bluetooth application and particular Bluetooth devices.

13. The system recited in claim 1 wherein each of said event packets comprises a channel identifier used by the HCI layer to direct said event packets between said Bluetooth application and particular Bluetooth devices.

14. The system recited in claim 1 wherein each of said data packets comprises a channel identifier used by the HCI layer to direct said data packets between said Bluetooth application and particular Bluetooth devices.

* * * * *